United States Patent [19]

Mawatari et al.

[11] 4,224,642
[45] Sep. 23, 1980

[54] PCM RECORDING AND REPRODUCING METHOD PROVIDING FOR DROPOUT COMPENSATION

[75] Inventors: Akinori Mawatari, Tachikawa; Hirohisa Yamaguchi, Tokyo; Kenji Nakamura, Tokorozawa; Satoshi Uchiumi, Tachikawa, all of Japan

[73] Assignee: TEAC Corporation, Tokyo, Japan

[21] Appl. No.: 904,892

[22] Filed: May 11, 1978

[30] Foreign Application Priority Data

May 18, 1977 [JP] Japan ................ 52/57488

[51] Int. Cl.² ............... G11B 5/00; G11B 15/02; G11B 5/09
[52] U.S. Cl. .................... 360/32; 360/22; 360/38; 360/47
[58] Field of Search ........... 360/40, 47, 48, 22, 360/24, 32, 38

[56] References Cited

U.S. PATENT DOCUMENTS

| | | | |
|---|---|---|---|
| 2,932,010 | 4/1960 | Mayer et al. | 360/48 |
| 3,092,816 | 6/1963 | Pawletko | 360/48 |
| 3,303,482 | 2/1967 | Jenkins | 360/47 |
| 3,721,773 | 3/1973 | Kluge | 360/47 |
| 3,743,793 | 7/1973 | Emerson | 360/48 |
| 3,761,903 | 9/1973 | Bird, Jr. et al. | 360/47 |
| 3,787,815 | 1/1974 | Farr, Jr. | 360/48 |
| 4,030,129 | 6/1977 | Whitlock | 360/32 |
| 4,041,453 | 8/1977 | Umeda et al. | 360/39 |
| 4,072,987 | 2/1978 | Walker | 360/48 |
| 4,138,694 | 2/1979 | Doi et al. | 360/32 |
| 4,143,406 | 3/1979 | Tsuiki et al. | 360/48 |

OTHER PUBLICATIONS

"On Several Standards for Converting PCM Signals into Video Signals," Journal of Audio Engr. Soc., 9/78, vol. 26, #9.

Primary Examiner—Vincent P. Canney
Attorney, Agent, or Firm—Woodcock, Washburn, Kurtz, Mackiewicz & Norris

[57] ABSTRACT

For recording and reproducing analog audio signals by a pulse-code modulation scheme so as to permit effective compensation for dropout errors, an incoming audio signal is sampled, and the analog samples are converted into a sequence of coded pulse groups or words. These words are grouped into successive notional blocks, and the odd and the even words, for example, of each block are divided into sub-blocks, as by sequentially writing the words of each block in successive storage locations in a memory and by retrieving the odd, and then the even, words from the memory. The sub-blocks of the successive word blocks are recorded in different regions on a recording medium such as magnetic tape. After being reconverted into an electrical signal from the recording medium, the words of the sub-blocks of each block are rearranged into the original order, as by use of a second memory, prior to the reconstruction of the analog audio signal.

15 Claims, 14 Drawing Figures

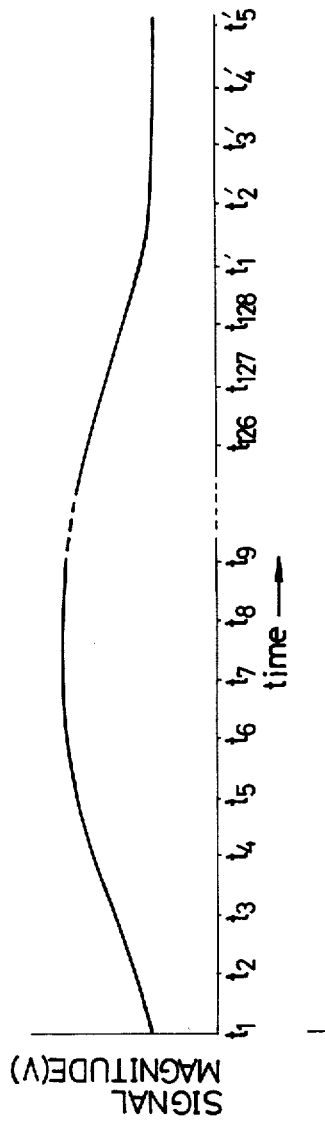
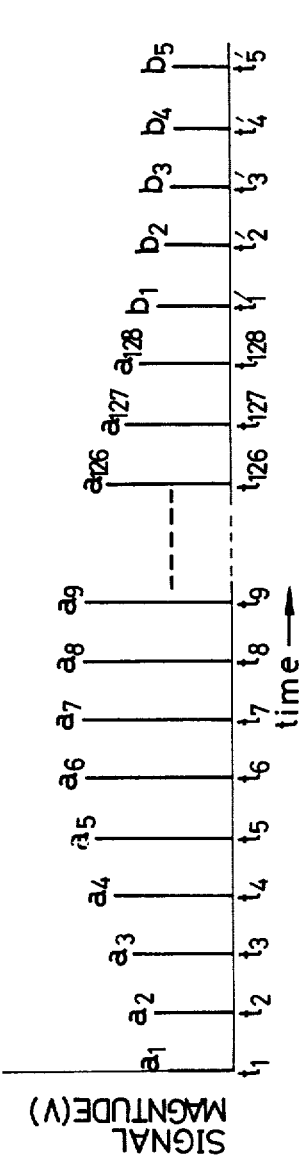
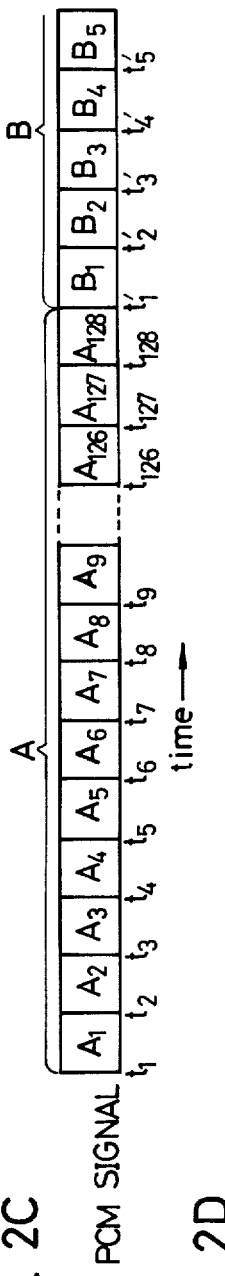
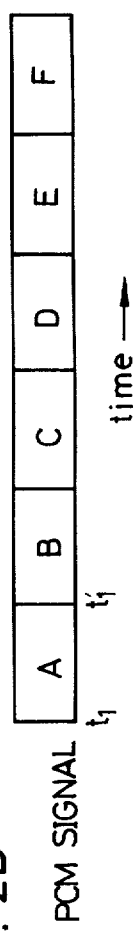
FIG. 2A
FIG. 2B
FIG. 2C
FIG. 2D

PCM RECORDING AND REPRODUCING METHOD PROVIDING FOR DROPOUT COMPENSATION

BACKGROUND OF THE INVENTION

1. Field of the Invention

Our invention relates to a recording and reproducing method, and in particular to such a method employing a pulse-code modulation (PCM) scheme. Still more particularly, our invention deals with a PCM recording and reproducing method well calculated to permit distortionless reconstruction of the original signal in spite of possible dropout errors. The method of our invention is disclosed herein as adapted for recording and reproducing audio signals on and from recording media such as magnetic tape or laser discs, but with no unnecessary limitations thereto being intended.

2. Description of the Prior Art

The processing of audio and video signals by the PCM technique has been known and practiced for some time now. With PCM, the signals can be recorded and reproduced with an extra-ordinarily high degree of faithfulness if no errors are introduced into the signals themselves, because the signal quality is unaffected by the qualities of the transmission media through which they journey. In practice, however, the signals are easy to suffer errors.

If, for example, foreign particles are attached to recording media such as magnetic tape, or if the recording media have some surface imperfections, then the signals will not be properly recorded on or reproduced from such defective regions of the recording media. These are causes for the problem known as dropouts. If a dropout error occurs to even one bit of a PCM word, the word may become unable to correctly represent the corresponding sample, or instantaneous value, of the original analog signal, possibly introducing noise into the information reproduced.

A variety of methods have been suggested and used for the correction or elimination of dropouts. The following four methods are among those best known: (1) to doubly or multiply record the same PCM signal and to reproduce either of the recordings having no dropout error; (2) to record an analog signal in both PCM and analog format and, upon detection of a dropout error in the PCM signal, to use the corresponding portion of the analog signal; (3) to interpolate an approximate value computed from the values preceding and succeeding the lost value; and (4) to compensate for the lost value by holding the preceding value.

The problem of dropouts can be overcome, to a considerable degree, by the use of the above enumerated methods, either singly or in combination of two or more. Each of these conventional methods has its own drawbacks, however.

Method (1), when employed singly for dropout elimination, necessitates the recording of the same PCM signal a considerable number of times. Method (2) requires the provision of additional equipment and an additional track for recording an incoming analog signal in analog format, and further precise synchronization must be realized between the analog and the PCM signals. According to method (3), complex circuitry is required for the computation of approximate values to be interpolated. This third method, moreover, is incapable of accurately compensating for a plurality of values lost consecutively. Method (4) permits easier compensation but is also incapable of accurately compensating for a plurality of values lost consecutively.

SUMMARY OF THE INVENTION

It is among the objects of our invention to provide an improved PCM recording and reproducing method which permits highly accurate and easy compensation for dropout errors.

Another object of our invention is to provide such as PCM recording and reproducing method which is compatible with other error correction or elimination methods.

A further object of our invention is to provide a PCM recording and reproducing method which can be practiced by use of a system built of readily available components.

A still further object of our invention is to provide a PCM recording and reproducing method suitable for use with audio signals, among other types of signals.

According to the method of our invention, stated in brief, an analog signal to be recorded is sampled at regular intervals, and the successive samples are converted into a sequence of words in accordance with a prescribed code of pulses. Every preselected number of the words are grouped into a notional block, and the words of each of the successive blocks are divided into at least two sub-blocks, in such a manner that the words of the sub-blocks are in at least one-by-one alternation, as will become more apparent as the description proceeds. These sub-blocks of the successive word blocks are recorded in different regions on a recording medium.

For reproducing the thus-recorded signal, the sub-blocks of the word blocks are reconverted into an electrical signal. The words of each block which have been divided into the sub-blocks are then rearranged into the original order, and the successive blocks of words are then reconverted into the original analog format.

Preferably, the odd words of each word block are grouped into the first sub-block, and the even words into the second sub-block. For this dividing the odd and the even words of each block into the first and the second sub-blocks, there may be employed a memory and two addressing circuits. The words of each block are first written sequentially in successive storage locations in the memory as dictated by one of the addressing circuits. Then, under the control of the other addressing circuit, the odd words of the block are read out to form the first sub-block, and the even words are subsequently read out to form the second sub-block.

The sub-blocks of the word blocks are recorded in successive regions on the recording medium such as magnetic tape. It is essential that the two sub-blocks of each block be recorded in different regions on the medium. A conventional video tape recorder may be employed for recording the signal as above. The rearrangement of the words of each block into the initial order, following their reconversion into an electrical signal from the recording medium, can also be effected by use of a memory and two addressing circuits.

Thus, even if several adjacent words of one sub-block are lost simultaneously, it is highly unlikely that those words of the other sub-block which are to intervene between the lost words be lost at the same time. When the words of the two sub-blocks are rearranged into the original order, therefore, no two consecutive words are lost. The several alternately lost words can be readily compensated for, as by the technique of interpolation or of holding the previous words.

The above and other objects, features and advantages of our invention and the manner of attaining them will become more readily apparent, and the invention itself will best be understood, from the following description taken in conjunction with the accompanying drawings.

BRIEF DESCRIPTION OF THE DRAWINGS

FIGS. 2A through 2H are representations of an audio signal in various stages of processing by the PCM recording system of FIG. 1;

DETAILED DESCRIPTION OF THE INVENTION

Figure 1:
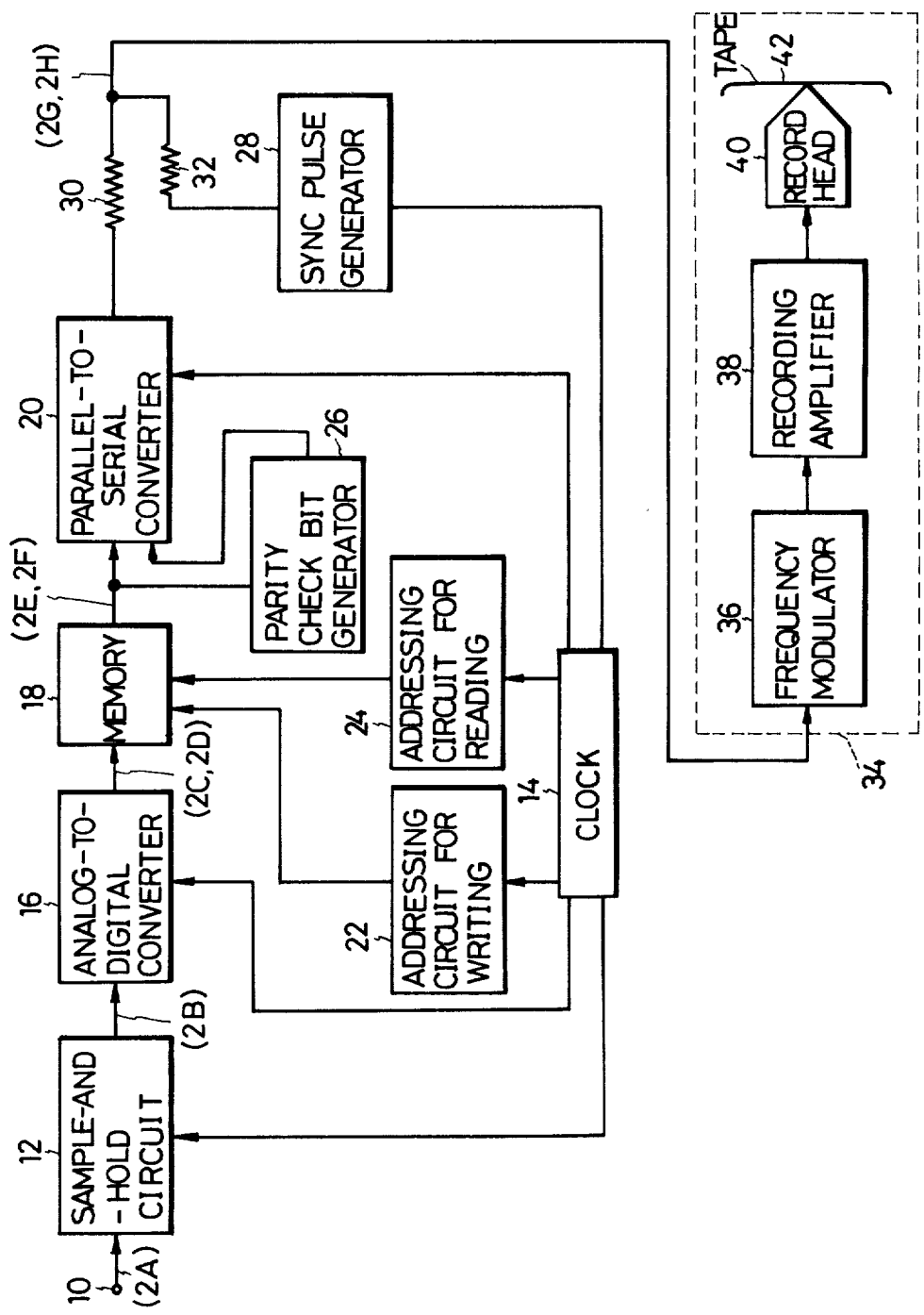
FIG. 1 is a block diagram of the recording section of a system which can be employed for the PCM recording and reproduction of audio signals on and from magnetic tape in accordance with the method of our invention.

The PCM recording and reproducing method of our invention will first be described briefly in connection with the recording section, shown in FIG. 1, of a PCM recording and reproducing system suitable for carrying out the inventive method. Utilizing a video tape recorder (VTR) for recording audio signals, the illustrated PCM recording system has an input terminal 10 connected to a sample-and-hold circuit 12, to which is also connected a clock 14. The sample-and-hold circuit 12 is thus adapted to sample the incoming analog audio signal at a rate determined by the accurately timed output pulses from the clock 14.

The output of the sample-and-hold circuit 12 is connected to an analog-to-digital converter 16 whereby the analog samples, or instantaneous values, of the audio signal are converted or modulated into words or groups of digital pulses in accordance with a prescribed pulse code. The output of the analog-to-digital converter 16 is connected to a memory 18, preferably of the scratch-pad design, and thence to a parallel-to-serial converter 20. The analog-to-digital converter 16 puts out the PCM signal with the bits of its code words in parallel format, and these words are written in the scratch-pad memory 18 with their bits in parallel format. The word bits of the PCM signal are, however, rearranged into serial format by the subsequently connected parallel-to-serial converter 20.

Further connected separately to the scratch-pad memory 18 are first and second addressing circuits 22 and 24 which are both under the control of the clock 14.

The first addressing circuit 22 is for use in sequentially writing the words of the PCM signal in the storage locations in the memory 18. The second addressing circuit 24 is for use in reading out or retrieving the PCM words from the memory.

The PCM words are written in the memory 18 in the sequence of their samplings but are retrieved therefrom in a completely different sequence. For their retrieval from the memory 18 in the desired sequence, the successive words are divided into a series of notional blocks each comprising a preselected number of such words. The alternate words (e.g., odd words) of each block are first retrieved successively, followed by the successive retrieval of the remaining words (e.g., even words) of the block, thereby providing first and second sub-blocks of each word block. This reading operation is performed, for example, twice consecutively for each of the successive word blocks, for purposes which will become apparent presently.

Besides being connected directly to the parallel-to-serial converter 20, the memory 18 is also connected thereto via a parity or odd-even check bit generator 26. This generator 26 delivers parity check bits to the parallel-to-serial converter 20, so that the latter, also under the control of the clock 14, puts out in the above sequence the PCM words of serial format carrying the parity check bits.

The clock 14 is further connected to a sync pulse generator 28 which generates grouping and subgrouping sync pulses. The output of the parallel-to-serial converter 20 and the output of the sync pulse generator 28 are interconnected via resistors 30 and 32 as shown, so that the words delivered from the converter 20 are combined with the grouping and the subgrouping sync pulses to form a composite PCM signal. This composite PCM signal is of three voltage values representing respectively the logical 1's and 0's of the pulse code and the sync pulses.

The grouping sync pulses, which in fact are similar to the vertical sync pulses of television signals, are generated at time intervals such that each preselected number of double word blocks from the parallel-to-serial converter 20 are grouped together so as to permit, for example, the convenient editing of tape after the composite PCM signal is subsequently recorded thereon. The subgrouping sync pulses are generated at much shorter time intervals and are intended to unitize the bits of every one or more words. The use of such sync pulses in the art of PCM recording and reproduction has been known.

Generally designated 34 is a VTR comprising a frequency modulator 36, a recording amplifier 38, and a record or a record/reproduce head 40. By this VTR 34 of prior art design is the composite PCM signal frequency-modulated, amplified, and recorded on magnetic tape 42. In thus recording the composite PCM signal on the tape 42 in FM format, the logical 1's of the signal may be translated, for example, into a frequency of 5.4 MHz, the logical O's of the signal into 4.6 MHz, and the sync pulses into 3.8 MHz. It is thus seen that the composite PCM signal can be recorded on the tape 42 in the same fashion as composite video signals.

The PCM recording system of FIG. 1 is easy to fabricate with the use of commercially available ICs for its component circuits. For example, the memory 18 can be formed by the IC Am 91L2 manufactured by Advanced Microdevices, Inc. (AMD); the parallel-to-serial converter 20 by the IC SN74LS165 manufactured by Texas Instruments, Inc. (TI); the first addressing circuit 22 by the IC SN74LS163 or SN74LS293 manufactured by TI; the second addressing circuit 24 also by the IC SN74LS163 or SN74LS293; and the parity check bit generator 26 by the IC SN74LS86 manufactured by TI.

Figure 2E:
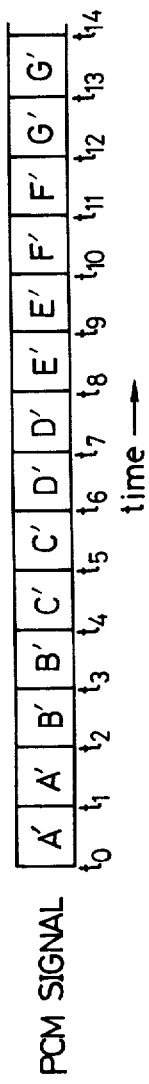

The PCM recording method of our invention will now be described in more detail in connection with the system of FIG. 1, with reference made also to FIGS. 2A through 2H which represent the audio signal being processed by the system. Let it be assumed that the analog audio signal supplied through the input terminal 10 of the PCM recording system has the waveform shown in FIG. 2A. The sample-and-hold circuit 12 samples this audio signal at moments t1, t2 ... t128, t1', t2'... in time, as indicated in FIG. 2B, thereby providing analog audio signal samples a1, a2 ... a128, b1, b2 ... The sampling rate is determined as aforesaid by the clock 14.

The successive samples of the incoming audio signal produced by the sample-and-hold circuit 12 are then modulated in accordance with the prescribed pulse code into a sequence of pulse groups or words A1, A2 ... A128, B1, B2 ..., as represented in FIG. 2C. The series of capitals A, B, C ... in FIG. 2D represent the successive blocks of words, with each word block containing 128 words A1 through A128, etc. These word blocks A, B, C ... are sequentially written in the memory 18. Although no particular distinction is actually made between the word blocks A, B, C ... in writing them in the memory, the words are shown divided into these notational blocks to facilitate the understanding of the subsequent reading operation, which will be explained presently.

Figure 2F:
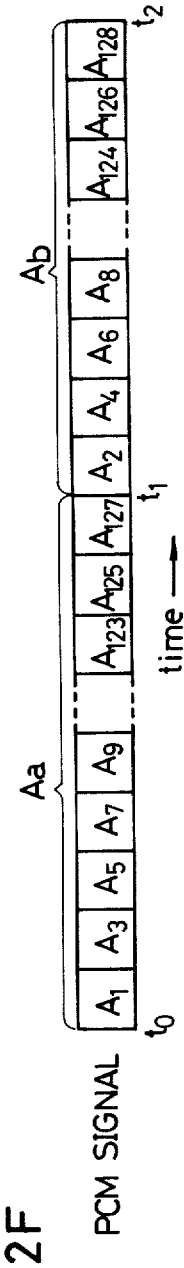
Figure 2G:
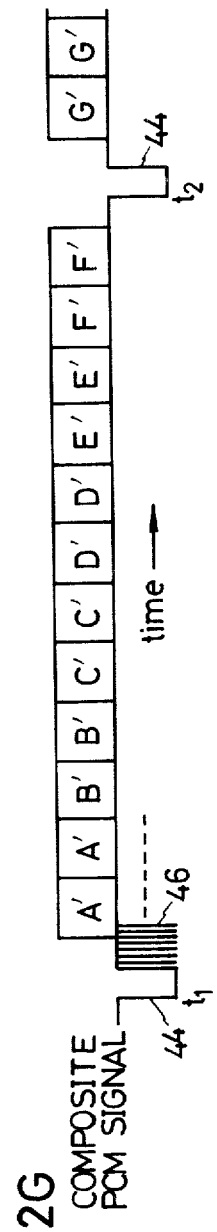
Figure 2H:
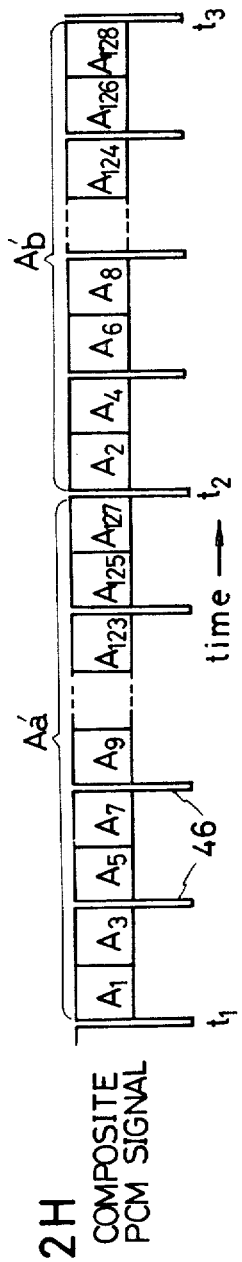
Figure 3:
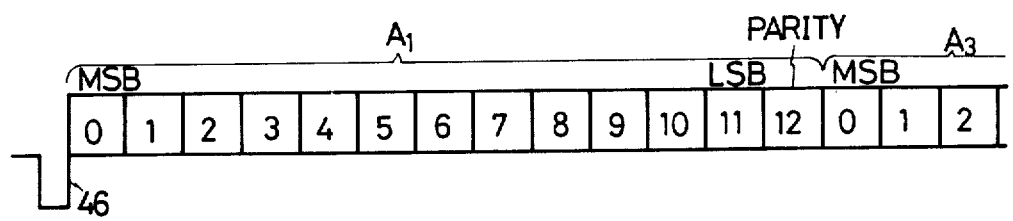
FIG. 3 is a representation of the bits of each word of the PCM signal being processed by the system of FIG. 1.
Figure 4:
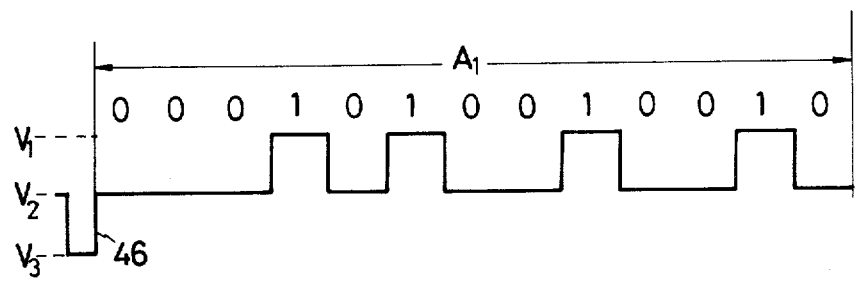
FIG. 4 is a waveform diagram showing an example of the pulse pattern of the word given in FIG. 3.

Although the individual words of the PCM signal are indicated in FIG. 2 merely by the characters A1, A2, etc., each word is assumed to be composed of 12 regular bits, plus a parity check bit to be added to the parity check bit generator 26, as represented in FIG. 3. The indicia MSB and LSB in FIG. 3 denote the most significant bit and the least significant bit, respectively. Thus, a given in FIG. 4, the word A1 is represented by a group of pulses corresponding to, for example, "0001010010010" of the binary system. In FIGS. 2C through 2H the words of the same word block are designated by the same capital regardless of whether they carry the parity check bits or not. Although FIGS. 3 and 4 shows the word bits of the PCM signal in serial format, these word bits are delivered in parallel format by the analog-to-digital converter 16 and are written in the memory 18 in that format, as previously mentioned.

The PCM signal is written word by word in the memory 18 in the order of the successive samplings, under the control of the first addressing circuit 22. These words are not retrieved from the memory 18 in the order they were written, however, but in the following sequence. Under the control of the second addressing circuit 24, the odd words A1, A3, A5 ... A123. A125 and A127 of the first word block A in FIG. 2C are first retrieved sequentially, followed by the sequential retrieval of the even words A2, A4, A6 ... A124, A126 and A128 of the first word block, as represented in FIG. 2F. There are thus obtained the first Aa and the second Ab sub-blocks of the first word block A, with the words of the two sub-blocks in one-by-one alternation.

As will be seen also from FIG. 2F, the first sub-block Aa of words A1, A3, A5 ... is retrieved from the memory 18 during the time interval t0–t1, and the second sub-block Ab of words A2, A4, A6 ... is retrieved during the immediately succeeding time interval t1–t2. As will be noted upon comparison of the first word block A given in FIG. 2C and its first Aa and second Ab sub-blocks given in FIG. 2F, the 128 words A1 through A128 constituting the first word block are all included in the two sub-blocks.

It is also to be noted that the retrieval of the PCM signal from the memory 18 is effected at a speed approximately twice (in practice, slightly more than twice) as high as the writing speed. This is to read out each of the word blocks A, B, C ... of FIG. 2D twice during the time expended for writing each word block.

FIG. 2E is explanatory of such double reading of each word block. The first word block A of FIGS. 2C and 2D is read twice, first during the time interval t0–t1 and then during the immediately succeeding time interval t1–t2, as indicated by the characters A'A' in FIG. 2E. Further, as mentioned in connection with FIG. 2F, the odd words of the first word block A are first read sequentially to provide the first sub-block Aa, and then the even words of the first word block are read sequentially to provide the second sub-block Ab. This procedure is performed twice. Each of the characters A'A' in FIG. 2E, therefore, should be understood to represent Aa'Ab.

Similarly, the odd words of the second word block B of FIGS. 2C and 2D are first read sequentially, and then the even words of the second word block are read sequentially. This procedure is also performed twice, as indicated by B'B' in FIG. 2E. Thus, by the repetition of the above double reading operation on each of the subsequent word blocks C, D. E ..., there can be obtained a rearranged sequence of words and word blocks represented in FIGS 2E and 2F.

The parallel-to-serial converter 20 is supplied with both the PCM signal retrieved in the above described manner from the memory 18 and the parity check bit signal from the parity check bit generator 26. The PCM signal of parallel format from the memory 18 is converted by the converter 20 into that of serial format, with each of its words composed of 13 serial bits as illustrated by way of example in FIGS. 3 and 4.

Under the control of the clock 14, the sync pulse generator 28 generates grouping sync pulses 44 and subgrouping sync pulses 46, as represented in FIGS. 2G and 2H. The grouping sync pulses 44 are generated at comparatively long time intervals, as at moments t1 and t2 in time in FIG. 2G. FIG. 2G shows the double word blocks A'A' through F'F' grouped together between the two grouping sync pulses 44 generated at the moments t1 and t2.

It should be noted that each of the successive groups of double word blocks thus formed by the grouping sync pulses 44 does not extend beyond either of the corresponding two grouping sync pulses. Thus, after recording the groups of double word blocks A'A' through F'F', G'G'..., etc., on the magnetic tape 42, this tape may be edited by separating the groups of double word blocks at the points where the grouping sync pulses 44 are recorded, without the least possibility of separating each of the double word blocks in so doing.

FIG. 2G shows only several of the subgrouping sync pulses 46, which are generated at much shorter time intervals than the grouping sync pulses 44. As clearly seen in FIG. 2H, the subgrouping sync pulses 46 are generated at moments in time corresponding to the points between every two of the successive words A1, A3, A5 . . . , A2, A4, A6 . . . , etc., thus unitizing every two words.

The above grouping 44 and the subgrouping 46 sync pulses are combined with the PCM signal of FIGS. 2E and 2F, into the composite PCM signal given in FIGS. 2G and 2H. As will be seen from FIG. 4, this composite PCM signal is of three values, including V1 and V2 for the logical 1's and 0's, respectively, of the PCM signal itself and V3 for the grouping and the subgrouping sync pulses. The characters Aa' and Ab' in FIG. 2H denote the first and the second sub-blocks, respectively, of the first word block A or A' including the subgrouping sync pulses 46. Although not shown specifically, the first and the second sub-blocks of the second word block B or B', for example, are to be designated Ba' and Bb', respectively, when combined with the subgrouping sync pulses 46.

Figure 5:
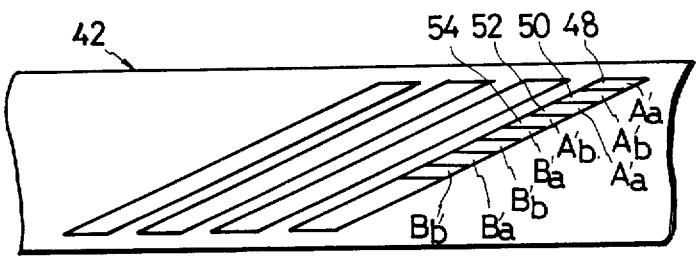
FIG. 5 is a fragmentary view of magnetic tape on which is recorded the PCM signal by the system of FIG. 1, the view being explanatory of the arrangement of regions on the tape in which are doubly recorded the sub-blocks of the successive blocks of words.

FIG. 5 is explanatory of the way the composite PCM signal of FIGS. 2G and 2H is recorded, after frequency modulation and amplification, on the magnetic tape 42 by the head 40 of the VTR 34. It will be noted that the composite PCM signal is recorded sub-block by sub-block in successive predetermined regions on the tape 42. More specifically, the first sub-block Aa' of the first word block A or A' is recorded in the first tape region 48, and the second sub-block Ab' of the first word block is recorded in the second tape region 50 adjoining the first tape region. The first sub-block Aa' is again recorded in the third tape region 52, and the second sub-block Ab' is again recorded in the fourth tape region 54. In a similar sequence the first and the second sub-blocks Ba' and Bb' of the second word block B or B' are doubly recorded in the fifth to eighth tape regions. The sub-blocks of the subsequent double word blocks C'C', D'D', E'E'. . . are likewise recorded in the succeeding tape regions.

As is well known, dropout errors usually occur to data recorded only in minute portions of the tape, without any regularity. Let it be supposed that a dropout error occurs to, for instance, the adjoining words A3 and A5 of the first sub-block Aa' recorded in the first region 48 of the tape 42. It is highly unlikely that a dropout error occur simultaneously to the word A4 of the second sub-block Ab' recorded in the second tape region 50. Thus, even if the two words A3 and A5 are lost, the word A4 therebetween exists to prevent the loss of three consecutive words.

It is thus seen that the PCM recording method of our invention permits highly accurate reconstruction of the original analog signal. Such accurate compensation for a missing word or words by interpolation or by the holding of the preceding word is easy since, in all likelihood, no two or more consecutive words are to be lost.

Figure 6:
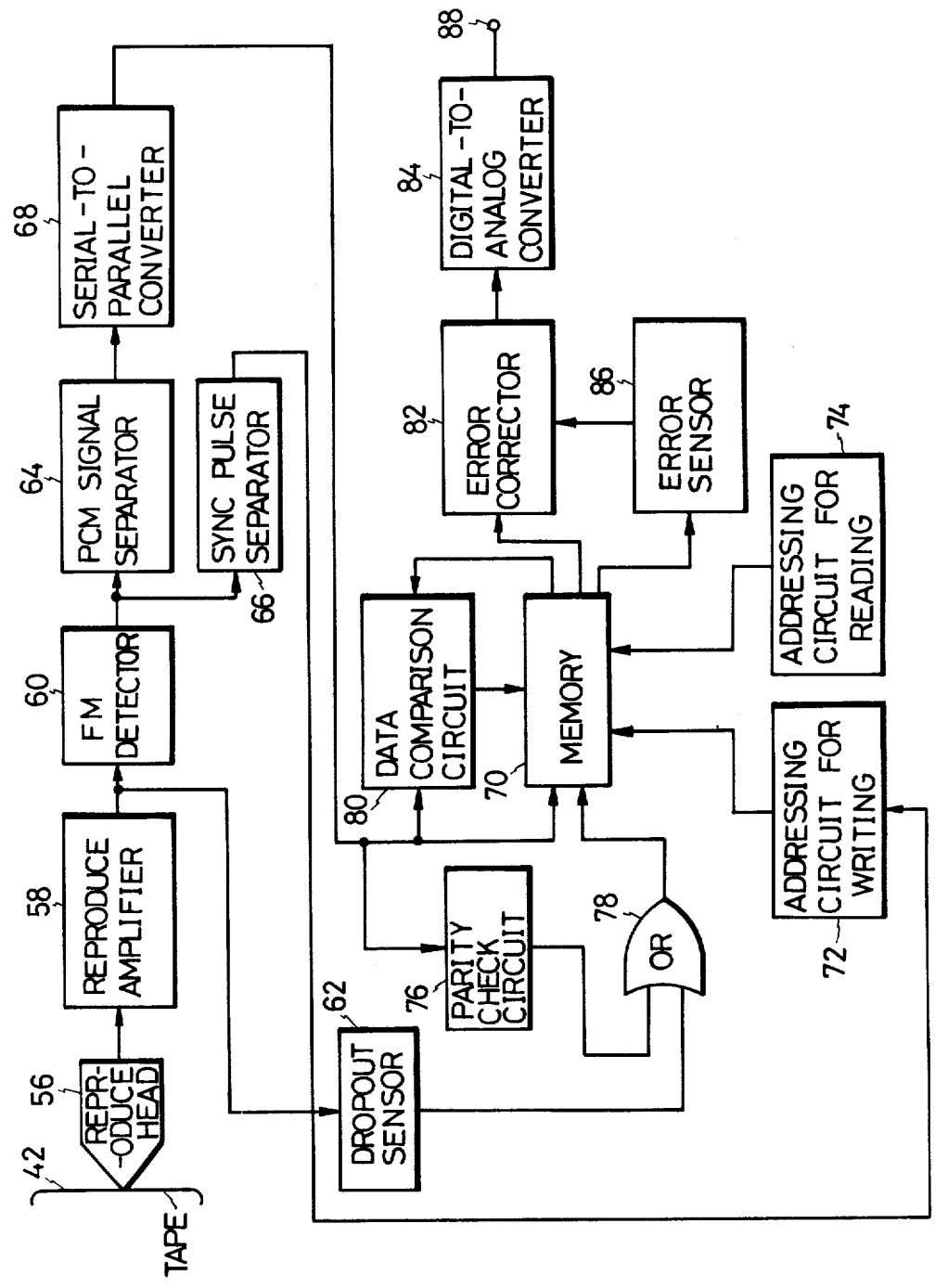
FIG. 6 is a block diagram of the reproducing section to be combined with the recording section of FIG. 1 to provide the PCM recording and reproducing system suitable for carrying out the method of our invention.

Schematically represented in FIG. 6 is a system for use in reproducing the PCM signal recorded in FM format on the tape 42 according to the method of our invention. The PCM reproducing system has the VTR including a head 56 which may be either a record/reproduce head unitized with the head 40 of FIG. 1 or a reproduce head separate from the head 40. The head 56 functions in the well known manner to reconvert the logical 1's of the PCM signal on the tape 42 into the frequency of 5.4 MHz, the logical 0's of the PCM signal into the frequency of 4.6 MHz, and the sync pulses combined with the PCM signal into the frequency of 3.8 MHz.

The output of the head 56 is connected to an amplifier 58 and thence to an FM detector 60. The FM output signal of the head 56 is therefore amplified and then detected or demodulated back into the three-value composite PCM signal such as that shown in FIG. 4. The amplifier 58 is further connected to a dropout sensor 62, which senses dropout errors from a reduction in the level of the output signal of the amplifier.

The output of the FM detector 60 is connected both to a PCM signal separator 64 and to a sync pulse separator 66. The output of the PCM signal separator 64 is connected to a serial-to-parallel converter 68 and thence to a scratch-pad memory 70. The output of the sync pulse separator 66 is connected via an addressing circuit 72 to the memory 70.

Separated from the sync pulses by the PCM signal separator 64, the PCM signal of serial format is converted into that of parallel format by the serial-to-parallel converter 68. This PCM signal of parallel format is then delivered to the memory 70. The grouping and the subgrouping sync pulses separated from the PCM signal by the sync pulse separator 66 are then delivered to the addressing circuit 72, thereby to be utilized for controlling the writing of the PCM signal in the memory 70.

Although the PCM signal delivered from the serial-to-parallel converter 68 to the memory 70 has the words of its word blocks arranged as in FIG. 2F, the words are not arranged in the memory 70 in the sequence of FIG. 2F but in that of FIG. 2C. Under the control of the addressing circuit 72, the odd words A1, A3, A5 . . . of the first sub-block Aa are written in every other one of predetermined storage locations in the memory 70. The even words A2, A4, A6 . . . of the second sub-block Ab are then written in the unoccupied storage locations between those occupied by the even words. The words are thus arranged in the original sequence of A1, A2, A3 . . . in the successive storage locations in the memory 70. As will be recalled by referring back to FIG. 2G, each word block is delivered twice consecutively from the serial-to-parallel converter 68, for purposes to be described later.

Another addressing circuit 74 is employed for retrieval of the words from the memory 70. The words of each block can be retrieved sequentially in the case where they are arranged in the sequence of A1, A2, A3 . . . in the successive storage locations in the memory 70 as above. It is also possible, however, to temporarily store the words of each block in the memory 70 without altering the sequence of FIG. 2C and to retrieve the words in the sequence of FIG. 2F. In this latter case the word A1 of the first sub-block Aa is first retrieved and, without retrieving the next word A3 of the first sub-block, the word 2 of the second sub-block Ab is retrieved, followed by the retrieval of the word A3.

The output of the serial-to-parallel converter 68 is connected not only to the memory 70 but also to a parity check circuit 76, which in turn is connected to one of the inputs of an OR gate 78. The other input of this OR gate is connected to the dropout sensor 62, and the output of the OR gate is connected to the memory 70.

The parity check circuit 76 conducts the parity check of the PCM signal from the serial-to-parallel converter 68, producing an output upon detection of a parity error. This output from the parity check circuit 76 is delivered to the memory 70 via the OR gate 78 thereby causing the memory to memorize the address of the erroneous word. The dropout sensor 62 also delivers an output, upon detection of a dropout error, to the memory 70 via the OR gate 76 thereby causing the memory to memorize the address of the erroneous word.

Also connected to the output of the serial-to-parallel converter 68 is a data comparison circuit 80 which has another input connected to the memory 70 and which has its output connected to the memory 70. The output of this memory 70 is connected to an error corrector 82 and thence to a digital-to-analog converter 84. The memory 70 is further connected to the error corrector 82 via an error sensor 86.

The serial-to-parallel converter 68 puts out as aforesaid the two consecutive recordings (i.e., the double word blocks A'A', B'B', C'C' . . . ) of each of the successive word blocks A, B, C . . . one after the other. The first recording (e.g., the sub-blocks Aa' and Ab' from the tape regions 48 and 50 of FIG. 5) of each word block from the converter 68 is written in the memory 70 regardless of whether it has a parity error or a dropout error or not. Thereafter, upon delivery of the second recording (e.g., Aa' and Ab' from the tape regions 52 and 54) of the word block from the converter 68, the data comparison circuit 80 compares this second recording with the first recording read out previously from the memory 70. Upon complete agreement of the first and the second recordings, the first recording is allowed to pass through the error corrector 82, without being processed, and into the digital-to-analog converter 84 thereby to be used for the reconstruction of the original analog audio signal.

Upon disagreement of the first and the second recordings of any word block, either of the recordings that has no parity error or dropout error (manifested by the absence of an output from the OR gate 78) is allowed to pass through the error corrector 82. This correct recording of the word block is also used by the converter 84 for the reconstruction of the analog audio signal.

If the first recording of any word block has a parity error or dropout error, for example, and if its second recording is correct, then this second recording is temporarily stored in the memory 70 and is retrieved therefrom to be used for the reconstruction of the analog audio signal by the converter 84. If both first and second recordings of the word block are incorrect, the error corrector 82 operates, under the control of the error sensor 86, to compensate for the erroneous word or words. The corrected word block is then delivered to the converter 84.

The error corrector 82 can be so constructed as to compensate by interpolation in the case where only one word is in error, and by holding the preceding word in the case where two or more consecutive words are in error. Errors seldom, if ever, occur to two or more consecutive words according to the method of our invention, however, because the odd and even words of the word block A or A', for instance, have been recorded in the different regions on the tape 42 as the sub-blocks Aa' and Ab'.

Even in the worst case, therefore, the several alternate words may be lost. The error corrector 82 is therefore capable of highly accurately and easily compensating for the alternately lost words by interpolation. It is also possible, of course, to cause the error corrector 82 to compensate for one lost word, or alternately lost words, by the holding technique.

The PCM signal thus retrieved in the correct sequence from the memory 70, with or without the subsequent error correction, is delivered to the digital-to-analog converter 84 thereby to be converted into the original analog format. There is thus obtained from an output terminal 88 the analog audio signal which is a highly faithful replica of the original received by the input terminal 10, FIG. 1, of the PCM recording system.

The PCM reproducing system of FIG. 6 can also be fabricated by use of various commercially available ICs. For example, the memory 70 can be formed by the IC Am91L02 manufactured by AMD; the first addressing circuit 72 by the IC SN74LS163 or SN74LS293 manufactured by TI; the second addressing circuit 74 also by the IC SN74LS163 or SN74LS293; the parity check circuit 76 by the IC SN74LS86 manufactured by TI; the data comparison circuit 80 also by the IC SN74LS86; and the error corrector 82 by the IC SN74LS283 manufactured by TI.

Figure 7:
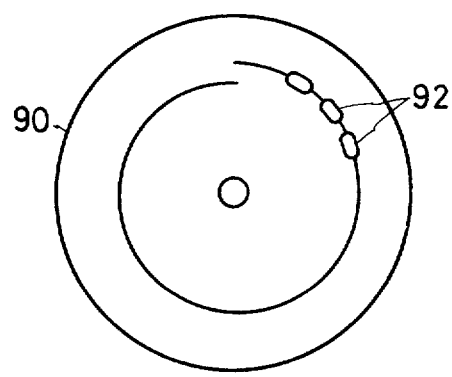
FIG. 7 is a schematic plan view of a laser disc which can also be employed as a recording medium in the practice of the method of our invention.

Although the PCM recording and reproducing method of our invention has been shown and described hereinabove in conjunction with magnetic tape, it will be apparent that other recording media such as magnetic discs and magnetic drums can also be employed. Another recording medium particularly suitable for use with the method of our invention is laser discs. As shown in FIG. 7, the laser disc 90 has formed therein a continuous, spiral row of patterned holes or "pits" 92 representative of the PCM signal in FM format. By applying a laser beam to the spiral information track, the information is read from the intensity of the light reflected by or passing through the disc.

Various other modifications are possible in the above described method of our invention. For example, instead of grouping the odd and the even words of each word block into two sub-blocks, such sub-blocks may be formed by alternate units of two or more words. Thus, for instance, the words A1, A2, A5, A6, A9, A10 . . . of the first word block A of FIG. 2C may be rearranged into the first sub-block, and the remaining words, A3, A4, A7, A8, A11, A12 . . . into the second sub-block.

Further, the words of each block may be grouped into more than two sub-blocks. When three sub-blocks of each word block are formed, for example, the first sub-block may comprise the words A1, A4, A7 . . . , the second sub-block the words A2, A5, A8 . . . , and the third sub-block the words A3, A6, A9 . . . Such three or more sub-blocks of each word block, of course, are to be recorded in different regions on magnetic tape or other recording media.

Still further, although each word block, and therefore its sub-blocks, is recorded twice in the illustrated example of the inventive method, the word blocks may be recorded only once, or more than twice, within the scope of our invention. It is also possible to provide spacings between the sub-blocks. Further yet, although the arrangement of the words and the word blocks shown in FIGS. 2E and 2F is realized when the PCM signal is read out from the memory 18 in the illustrated example, the words may be written in this arrangement in the storage locations in the memory. The words in the successive storage locations can then be read out sequentially.

All these and other modifications and changes of our invention which will readily occur to those skilled in the art are intended in the foregoing disclosure. It is therefore appropriate that the invention be construed broadly and in a manner consistent with the fair meaning or proper scope of the subjoined claims.

We claim:

1. In a method of recording and reproducing an analog signal by a pulse-code modulation scheme, the steps of:
    (a) sampling the analog signal at regular intervals;
    (b) converting the samples of the analog signal into a sequence of words of parallel bit format in accordance with a prescribed code of pulses;
    (c) dividing the words of each of successive word blocks, each word block composed of a preselected number of the words, into at least two sub-blocks, the words of the sub-blocks of each word block being in at least one-by-one alternation;
    (d) converting each word from parallel to serial bit format; and
    (e) recording the sub-blocks of the successive word blocks in successive regions of a single track on a recording medium.

2. The PCM recording and reproducing method as recited in claim 1, wherein the sub-blocks of each word block are composed of the odd and the even words, respectively, of the word block.

3. The PCM recording and reproducing method as recited in claim 1, wherein the sub-blocks of each word block are recorded at least twice in successive different regions of the track on the recording medium.

4. The PCM recording and reproducing method as recited in claim 1, wherein the analog signal is an audio signal.

5. The PCM recording and reproducing method as recited in claim 1, wherein the recording medium is magnetic tape.

6. The PCM recording and reproducing method as recited in claim 1, wherein the recording medium is a laser disc permitting the signal to be recorded thereon in the form of a pattern of pits.

7. In a method of recording and reproducing analog signals by a pulse-code modulation scheme, the steps of:
    (a) obtaining samples of an incoming analog signal at a predetermined sampling rate;
    (b) converting the samples of the analog signal into a sequence of words of parallel bit format in accordance with a prescribed code of pulses;
    (c) writing the words in a memory under the control of a first addressing circuit and then retrieving the words from the memory under the control of a second addressing circuit, in such a manner that each of successive word blocks retrieved from the memory, each word block composed of a preselected number of the words, is divided into at least two sub-blocks, with the words of the sub-blocks of each word block being in at least one-by-one alternation;
    (d) converting the words retrieved from the memory from parallel to serial bit format;
    (e) combining the words with grouping and sub-grouping sync pulses to form a composite PCM signal; and
    (f) recording the composite PCM signal along a single track on a recording medium, with the sub-blocks of the successive word blocks recorded in successive different regions of the track.

8. The PCM recording and reproducing method as recited in claim 7, wherein the words are written in successive storage locations in the memory under the control of the first addressing circuit and are retrieved from the memory under the control of the second addressing circuit in such a sequence that the words of each word block are divided into the at least two sub-blocks in at least one-by-one alternation.

9. The PCM recording and reproducing method as recited in claim 7, wherein the composite PCM signal is recorded on the recording medium by means of a video tape recorder including a frequency modulator.

10. A method of recording and reproducing an analog signal by a pulse-code modulation scheme, which comprises the steps of:
    (a) sampling the analog signal at regular intervals;
    (b) converting the samples of the analog signal into a sequence of words of parallel bit format in accordance with a prescribed code of pulses;
    (c) dividing the words of each of successive word blocks, each word block composed of a preselected number of the words, into at least two sub-blocks, with the words of the sub-blocks of each word block being in at least one-by-one alternation;
    (d) converting each word from parallel to serial bit format;
    (e) recording the sub-blocks of the successive word blocks in successive regions of a single track on a recording medium;
    (f) reconverting the sub-blocks of the word blocks recorded on the recording medium into an eletrical signal in the order of the successive regions of the track thereon;
    (g) rearranging the words of the sub-blocks of each word block into the original order; and
    (h) reconstructing the original analog signal from the successive blocks of words.

11. A method of recording and reproducing analog signals by a pulse-code modulation scheme, which comprises the steps of:
    (a) sampling an incoming analog signal at regular intervals;
    (b) converting the samples of the analog signal into a sequence of words of parallel bit format in accordance with a prescribed code of pulses;
    (c) writing the words in, and retrieving same from, a first memory in such a manner that the words of each of successive word blocks, each word block composed of a preselected number of the words, are divided into at least two sub-blocks, the words of the sub-blocks of each word block being in at least one-by-one alternation;
    (d) converting the words retrieved from the memory from parallel to serial bit format;
    (e) combining the words with grouping and sub-grouping sync pulses to form a composite PCM signal;
    (f) recording the composite PCM signal along a single track on a recording medium, with the sub-blocks of the successive word blocks recorded in successive different regions of the track;
    (g) reconverting the composite PCM signal on the recording medium into an electrical signal, with the sub-blocks of the word blocks being recovered from the recording medium in the order of the successive regions of the track thereon;
    (h) removing the grouping and subgrouping sync pulses from the composite PCM signal;
    (i) reconverting the words from serial to parallel bit format;
    (j) writing the words in, and retrieving same from, a second memory in such a manner that the words of the sub-blocks of each word block are rearranged into the original sequence; and (k) reconstructing the original analog signal from the successive blocks of words.

12. The PCM recording and reproducing method as recited in claim 11, further comprising a step of correcting, if necessary, errors in the words retrieved from the second memory.

13. The PCM recording and reproducing method as recited in claim 11, wherein the sub-blocks of each word block are recorded at least twice in successive different regions of the track on the recording medium, and wherein the recordings of each word block are compared with each other by a data comparison circuit operatively associated with the second memory, whereby only a correct one of the recordings of each word block is put out by the second memory when at least either of the recordings is correct.

14. The PCM recording and reproducing method as recited in claim 11, wherein the words of the sub-blocks of each word block are written in successive storage locations in the second memory in the original order under the control of a first addressing circuit, and wherein the words in the successive storage locations in the memory are retrieved sequentially under the control of a second addressing circuit.

15. The PCM recording and reproducing method as recited in claim 11, wherein the words are recorded in the recording medium after being frequency-modulated, and wherein the words reconverted into an electrical signal from the recording medium are demodulated before being reconverted from serial to parallel bit format.

* * * * *